United States Patent [19]

Wagner et al.

[11] Patent Number: 5,600,565
[45] Date of Patent: Feb. 4, 1997

[54] METHOD AND APPARATUS FOR ERROR REDUCTION IN ITEM PACKAGING

[75] Inventors: Steven L. Wagner; Stephen E. Wheeler, both of Rochester, Minn.

[73] Assignee: International Business Machines Corporation, Armonk, N.Y.

[21] Appl. No.: 363,197

[22] Filed: Dec. 22, 1994

[51] Int. Cl.⁶ ........................................ G06F 17/00
[52] U.S. Cl. ........................ 364/478.07; 235/385
[58] Field of Search ..................... 364/478, 401–403, 364/468; 235/375–385, 462, 454, 494; 340/825.34; 101/2; 283/70, 81, 903; 209/3.3, 583

[56] References Cited

U.S. PATENT DOCUMENTS

| 4,365,148 | 12/1982 | Whitney | 235/383 |
|---|---|---|---|
| 4,419,573 | 12/1983 | von Geldern | 235/383 |
| 4,463,250 | 7/1984 | McNeight et al. | 235/385 |
| 4,514,815 | 4/1985 | Anderson | 364/478 |
| 4,832,204 | 5/1989 | Handy et al. | 209/3.3 |
| 4,832,341 | 5/1989 | Muller et al. | 283/903 |
| 5,038,283 | 8/1991 | Caveney | 364/403 |
| 5,051,565 | 9/1991 | Wolfram | 235/384 |

*Primary Examiner*—Roy N. Envall, Jr.
*Assistant Examiner*—Steven R. Garland
*Attorney, Agent, or Firm*—J. Michael Anglin; Matthew J. Bussan

[57] ABSTRACT

Each item a system or order group carries a label having, in addition to a predetermined primary code denoting its item type, another, secondary, code representing a random identifier for that individual item. When a system or order group is to be packaged, a worker selects each item according to a list, scans its label, and physically places the item with the order group. The predetermined primary and random secondary codes are compared with those of previous items in the same order group. A complete match with the codes of another item in the same group causes the item to be rejected.

12 Claims, 5 Drawing Sheets

METHOD AND APPARATUS FOR ERROR REDUCTION IN ITEM PACKAGING

BACKGROUND OF THE INVENTION

The present invention relates to the packaging of individual items to be shipped as a group, and more specifically concerns the reduction of errors and omissions in selecting the individual items to be included in the group.

There are few things more frustrating than opening the shipping carton of your expensive new computer, unpacking all the manuals, cables, fasteners, and setup diskettes—and finding that one of the three power cords necessary even to turn the computer on is missing from the carton. Wait until Monday. Telephone calls. Music on hold. Ship the cable next-day air. Ask someone to watch for the delivery truck. Wrong cable. Repeat. Story of missing horse-shoe nail comes to mind.

This scenario has many variations. Buy swing set for children. "Some" assembly required. Unpack and check off bags of small parts. One bag of six frammis-head screws, unavailable at local hardware stores, is missing. There is little consolation in the fact that an extra bag of seat hooks has been substituted. Telephone calls. Et cetera. Or, as a more mundane example: A trip to the grocery has given you all the ingredients for a long-planned barbecue at the weekend cottage. As the festivities begin, you discover that only one of the two bottles of barbecue sauce needed had found its way into the bag. Return to the store in the city from Lake Faraway? No time. Will you shop at that grocery again?

The above problems all arose when a shipping worker—system assembler, dock clerk, grocery checker—picked up individual items in an order from a kitting list, ship order, grocery cart, scanned a code on each item, and gently placed them into a package for that order. The errors mostly happen when a difference arose between what was scanned and what was placed in the shipping container. Frequently, the worker sees multiple items of the same kind in an order, and scans the bar code for one item multiple times. He then may or may not throw the correct number of actual items into the carton. The worker may be interrupted after placing an item in the carton, and, having lost his place in the list, try to place a duplicate item in the carton. Really creative workers sometimes retrieve labels from scrap parts, tape them to a nearby wall, and scan these labels as they throw—or fail to throw—the actual item into the canon.

Eliminating this type of error will not solve all the problems of the shipping floor and checkout lane, but we believe that it will solve most of them in many diverse situations and industries.

In some cases, the use of a unique serial number on each item might alleviate the problem: scanning the same serial number more than once would kick up an alarm. However, serial numbers are impractical for small commodity-type parts. Too much tracking and paperwork is needed. Even if they were practical, the use of multiple sources for the same part would require a separate manufacturer number to guarantee uniqueness. Breakfast cereal serial numbers? Totally impractical.

SUMMARY OF THE INVENTION

Many of the errors associated with packaging items or components in a ship group or order could be sharply decreased if a unique label could be associated with each individual item or component of a given type of item. The present invention proposes to do this, and to do it easily and inexpensively, without the overhead of assigning codes such as serial numbers or manufacturer codes to each item.

Briefly, the invention proposes that each item or component in a system or order group carry a label having, in addition to the conventional primary code denoting its item type, another, secondary, code representing a random identifier for that individual item. The identifier can represent a number, an alphanumeric designation, or something of no external significance whatever. The randomness of the secondary code may exist over its own item type, over a larger range such as an entire group of items capable of being included in an entire order, or over a smaller range such as a single lot of the same item type likely to appear together on a shipping dock.

When a system or order group is to be packaged from items having such labels, a worker selects each item according to a list, scans the label, and physically places the item with the order group. The predetermined primary and random secondary codes are compared with those of previous items in the same order group. A complete match with the codes of another item in the same group causes the item to be rejected.

DESCRIPTION OF A PREFERRED EMBODIMENT

Figure 1:
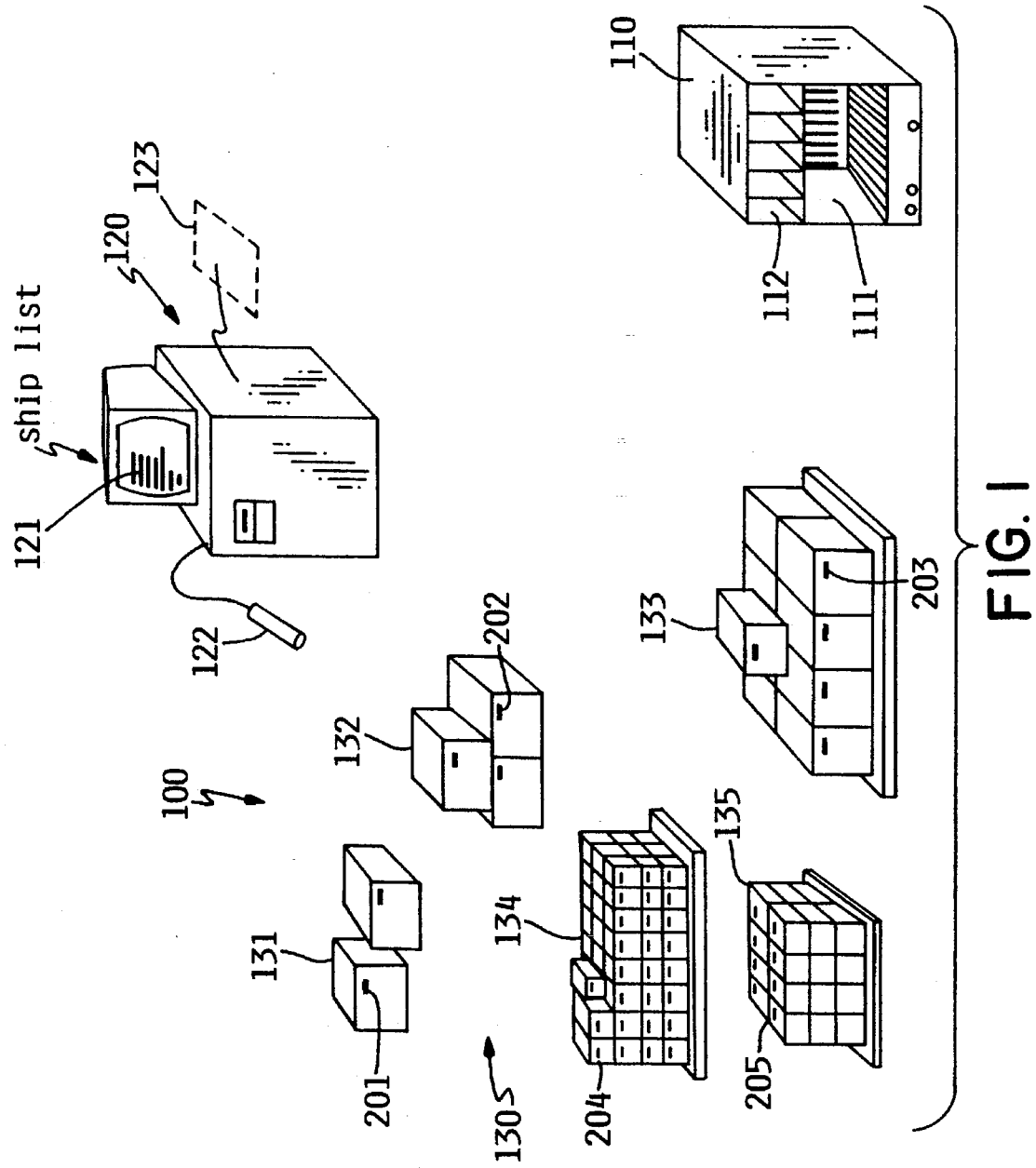
FIG. 1 shows a complex system packaged from individual labelled component items according to the invention.

FIG. 1 is a more or less pictorial representation of a packaging area 100 where complex systems are assembled and packaged for shipment to a customer. In this embodiment, the system 110 is a midrange computer. Each such system is customized according to the features desired by a particular customer. That is, each system 110 is built to order from a list 121 of component items 130 stocked at the packaging area 100. For example a particular system might require that one processor card package 131 and an I/O card package 132 be inserted into the system cage 111, and that two disk drives 133 be assembled into bays 112. Connecting these components requires four 3-foot cables. These cables are on two different pallets 134 and 135, because they have been purchased from two different suppliers. The present concept is particularly useful where parts are packed loose or unassembled: that is, where manuals, cables, mounting hardware, and other small parts are to be shipped along with a major component, but not assembled into it at the shipping site. Loose packing is notoriously subject to errors in part numbers and number of parts. Loose ("ship group") packing is typically performed in or near a primary assembly area.

Assembly-area computer 120 may display the list 121 of items needed for assembling a particular system 110. The person who assembles the system chooses an item from the list, takes an item from the appropriate pile, and scans a label 201–205 located on the item itself or on its package, with a hand scanner 122 connected to computer 120. This computer records certain codes on the label which specify the type of the item (by part number or other category) and which also identify it uniquely with respect to all other items of the same type currently located in area 100. A file 123 stored within computer 120 accumulates these codes as they are scanned. If a component is omitted or improperly selected during the assembly of system 110, computer 120 produces an error signal to the person assembling the system, as described in connection with FIG. 3. While developed primarily for manual counting and assembly of orders, the same concept may also be used with automated packing equipment by providing a suitable means for automatically scanning labels 201–205.

Figure 2:
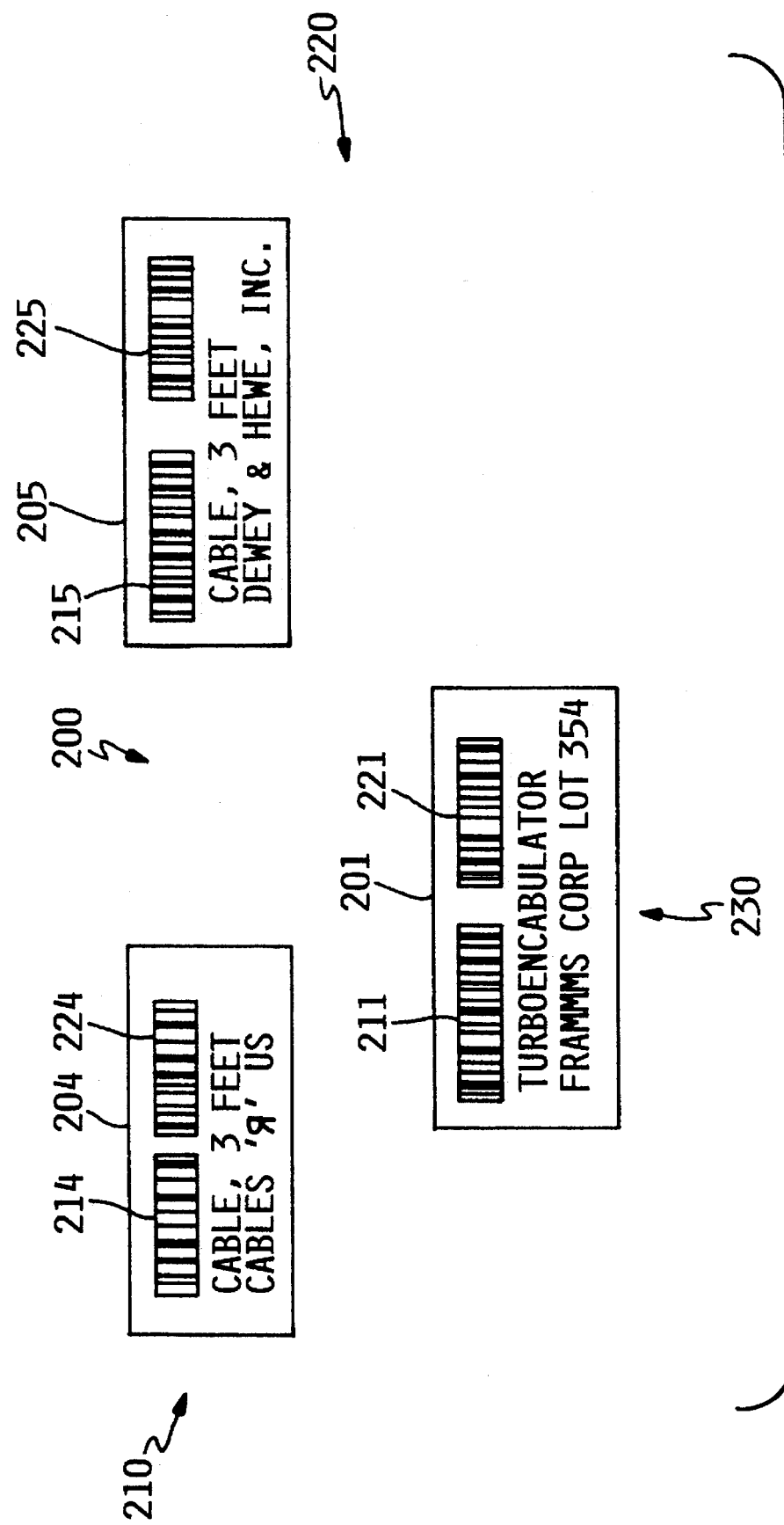
FIG. 2 shows the details of some of the labels shown in FIG. 1.

FIG. 2 depicts sample labels 201, 204, and 205 (collectively 200) which are useful in the system of FIG. 1. Labels 200 carry a first code 211, 214, and 215 (collectively 210) and a second code 221, 224, and 225 (collectively 220), which may be in any convenient form for human or machine reading. In the present context (and in most other fields as well), these codes are preferably conventional bar codes which can be read into a computer with easily available hand-held scanners. The codes themselves may follow the conventional universal product code (UPC) format, or some other format convenient to the purpose at hand. For convenience of exposition, the codes will be referred to as 'numbers', although their significance is irrelevant to the invention: they may represent numbers, alphanumeric characters, or nothing at all. Labels 200 may also include other information 231, 234, and 235 (collectively 230), such as the manufacturer's name, the name of the component, and/or a lot number. This additional information may be in human-readable form, coded form, or any combination; it is not used in the present embodiment. Although labels 200 are shown as separate objects which are affixed to components 130, they may also be printed directly upon the component items, etched into their surface, or otherwise associated with them in any way or combination of ways which is desirable, as long a machine readability is maintained. It is even possible, for example, that the 'labels' could consist of data stored within the components themselves and which is read out electronically, either by a computer such as 120, or by the system 110.

Code 210 is a first or primary code which represents the type of component bearing the label; this is usually a part number, but it may be some other class or category name. Code 211 of label 201, for example, may specify a part number such as '3141592653', which represents a particular type or model of processor assembly 131, FIG. 1. Similarly, code 214 of label 204 identifies component item 134 as a 3-foot cable by its particular part number. Code 215 of label 205 identifies item 135 as a 3-foot cable interchangeable with item 204; in this case, type code 205 may be the same as type code 204, or it may differ. (In the latter case, the assembly bill of materials contains both of the part numbers, as alternatives.) If the two suppliers of this cable have been given a single part number to use, they may be both given the same number. If the suppliers designate their own numbers, or if the system assembler wishes to be able to identify which supplier has provided the cable for a particular system, then the type numbers may differ, even though the items themselves are interchangeable. In the latter case, computer 120 may easily be programmed to accept either type number in satisfaction of the corresponding item on list 121, FIG. 1, and to make any convenient entry within file 123.

Code 220 is a secondary code which represents a random number or other designation such that the combination of code 210 and code 220 on any item 130 can be expected to differ from any other such combination within a specified set of items. For example, the codes 211 and 221, taken together, constitute a combination which, to a very high confidence level, uniquely identifies label 201 on component 131 from the label on any other component 130 (and therefore on any other component 131) in manufacturing area 100, FIG. 1. (This combination, however, does not absolutely or algorithmically guarantee uniqueness within area 100, and it is immaterial whether or not it is likely to be unique over different areas 100 of the same system assembler or of different assemblers.) Codes 210 on labels 200 serve to uniquely identify, via part number or other type identifier, item types 131–135 from one another within the group of items 130. Codes 220 on labels 200 uniquely identify individual parts within any type, such as within type 132.

The system assembler gives the suppliers of the various components 130 either a set of values from which the random numbers can be chosen or merely the size of such a set. (Again, designations other than numbers may be used if desired.) The size of the set can be determined in many different ways, using well-known statistical principles. If the overall size of the total production run is known, and if that size does not exceed the number of characters that could conveniently be used for code 220, individual codes 221, &c. for a specific type 211 may be randomly drawn from a non-replenishing set the size of the production run. This is the simplest method, and has guaranteed uniqueness, but it is impractical for large run sizes and long runs. Preferably, the pool size is smaller than the overall run size; it is statistically designed to produce non-repetitive code values with a desired confidence level over a predetermined interval of incoming lot size and usage rate. This method significantly reduces the number of code characters, and hence the size of the labels—a particularly useful characteristic for small parts and for long production runs. The following variables are important in fixing the size of the code pool:

Supplier's incoming lot size; the supplier's incoming lot frequency; the usage lot size (that is, the stock quantity held at the assembly line);

Maximum usage multiple (the largest number of the same part type in any one ship group);

Usage lot frequency;

Maximum acceptable repetition rate within a lot;

Maximum acceptable repetition rate per usage (i.e., the false-positive rate);

The number of different suppliers for parts of the same type.

Any conventional random-value generation process is suitable for use.

In the case of interchangeable items such as 134 and 135, the size of the set of secondary codes depends upon whether their type codes 214 and 215 are effectively the same, or are treated as being different. If the values of codes 214 and 215 are the same, then the size of the pool from which their secondary codes are drawn must increase at least as the square root of the number of different suppliers in order to maintain the same confidence level of uniqueness.

The present invention also works seamlessly where suppliers or the customer might prefer that each specimen of a component type be identified uniquely by algorithmic means. For example, processor card packages 131, FIG. 1, might be made by a single supplier who wishes to provide a consecutive serial number to each individual specimen of the same type; or multiple suppliers of the same component might employ serial numbers along with preassigned manufacturer numbers. In such cases, the serial number, combined serial/manufacturer number, serial/date, serial/lot, or other formulated unique number can be used as a secondary code. Such algorithmically generated codes will flow through the method of FIG. 4 in exactly the same manner as the non-algorithmic random secondary codes of the invention, without making any special provisions for their occurrence. Although unique algorithmic secondary codes perform the same gross function as do random secondary codes, random codes can reduce the number of code characters (an hence the label size), eliminate tracking costs, and accommodate multiple suppliers without requiring communication among them.

Figure 3:
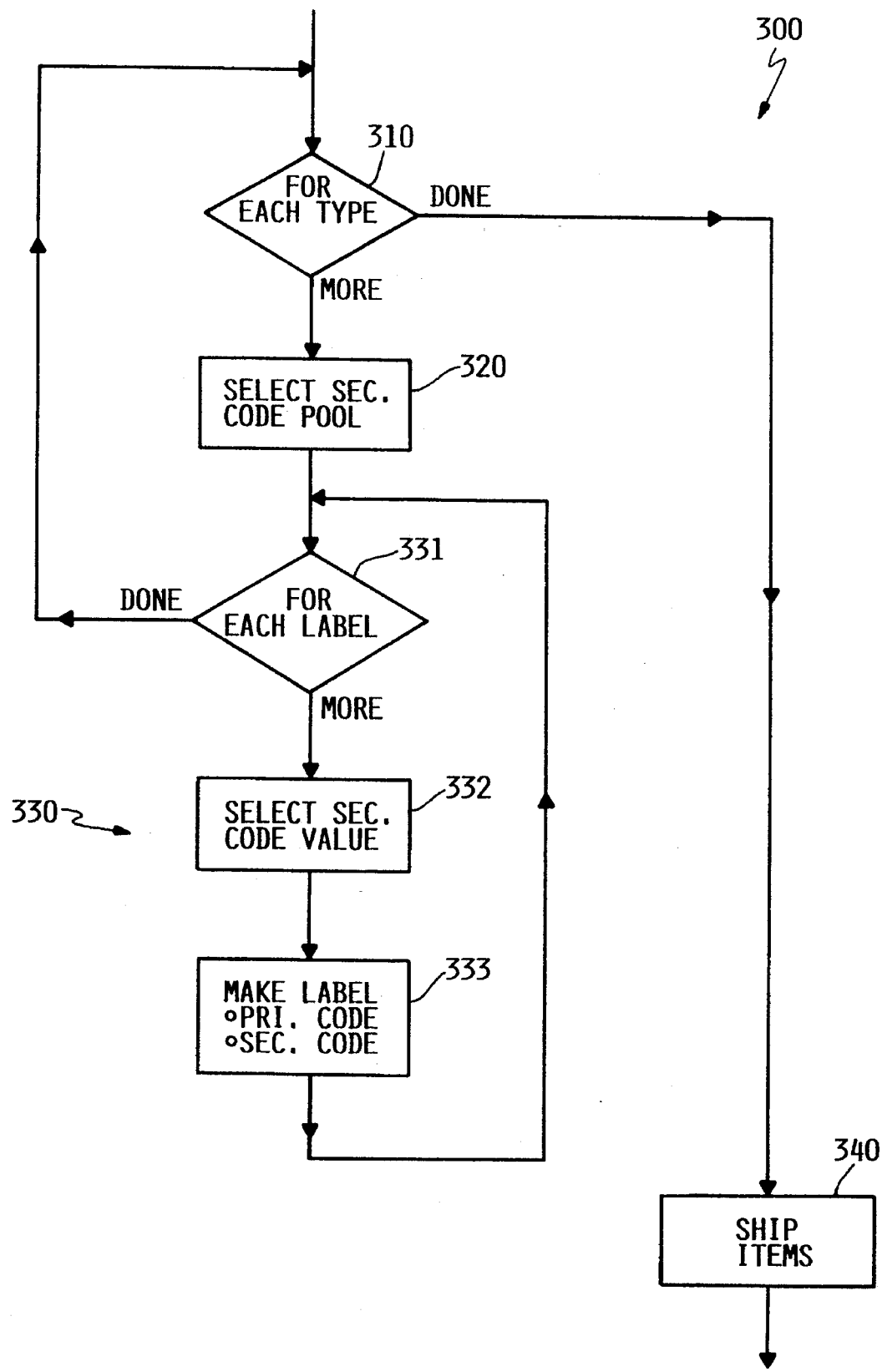
FIGS. 3 and 4 show a flow chart of a packaging method according to the invention.

FIG. 3 is a flow chart of a method 300 for a supplier to label components or items so as to reduce packaging errors according to the invention. Block 310 performs the method once for each type of component 130 to be processed. Any particular supplier may produce one or more component types for its customer who assembles multiple components into a system or otherwise packages them into a customized group or order.

Step 320 selects a pool of secondary codes for the current component type. As discussed above, the number of different code values in the pool—that is, the size of the pool—is large enough to maintain a high level of confidence that all labels are effectively unique within the specified interval for any customer, as defined above. In most situations, the customer will specify the size of the secondary-code pool, and the supplier will specify the particular set or range of values to be employed. Again, it will be assumed in this embodiment that label code values are numbers, although they may represent anything or nothing.

Blocks 330 generate the label for each specimen of the current component type. Block 331 performs the remaining blocks once for each specimen, returning control to block 310 when all specimens have been labelled. Block 332 selects one particular value at random from the pool of secondary codes specified in block 320, with or without replacement, as described elsewhere. Block 333 prints or otherwise affixes a label 200, FIG. 2, containing the primary code value 210 for the current type, the random secondary code value 220, and any other information 230.

In block 340, the supplier ships the labelled components to the customer. Obviously, shipment can occur at any time during the process 300: continuously, when each type is finished for a particular run, in lots during the production of a single component type, or whatever method is most convenient. It is important to note that the interval between statistically probable repetitions of the secondary-code values be larger than the stock/use interval with respect to the user's specific inventory system.

Figure 4A:
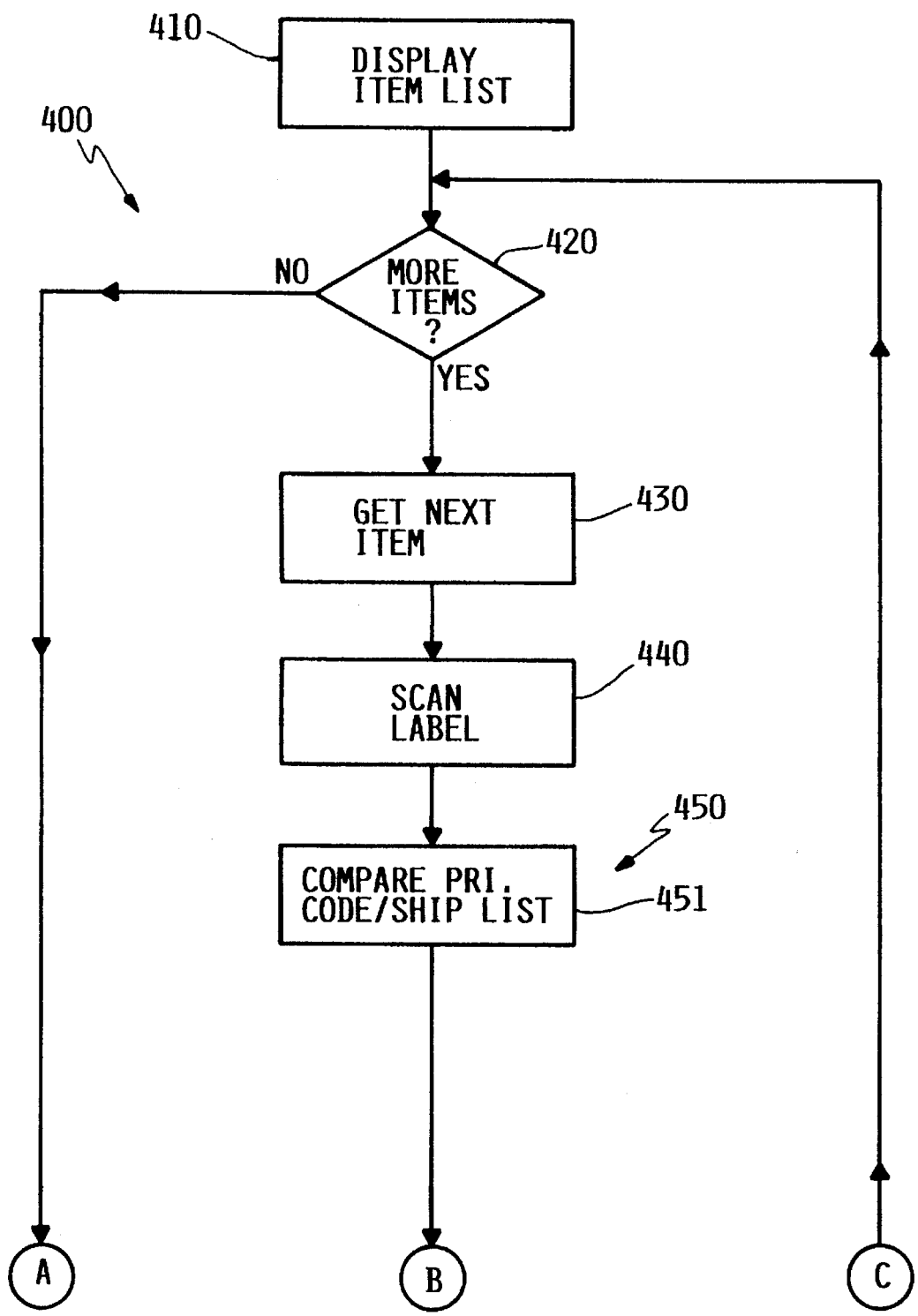
Figure 4B:
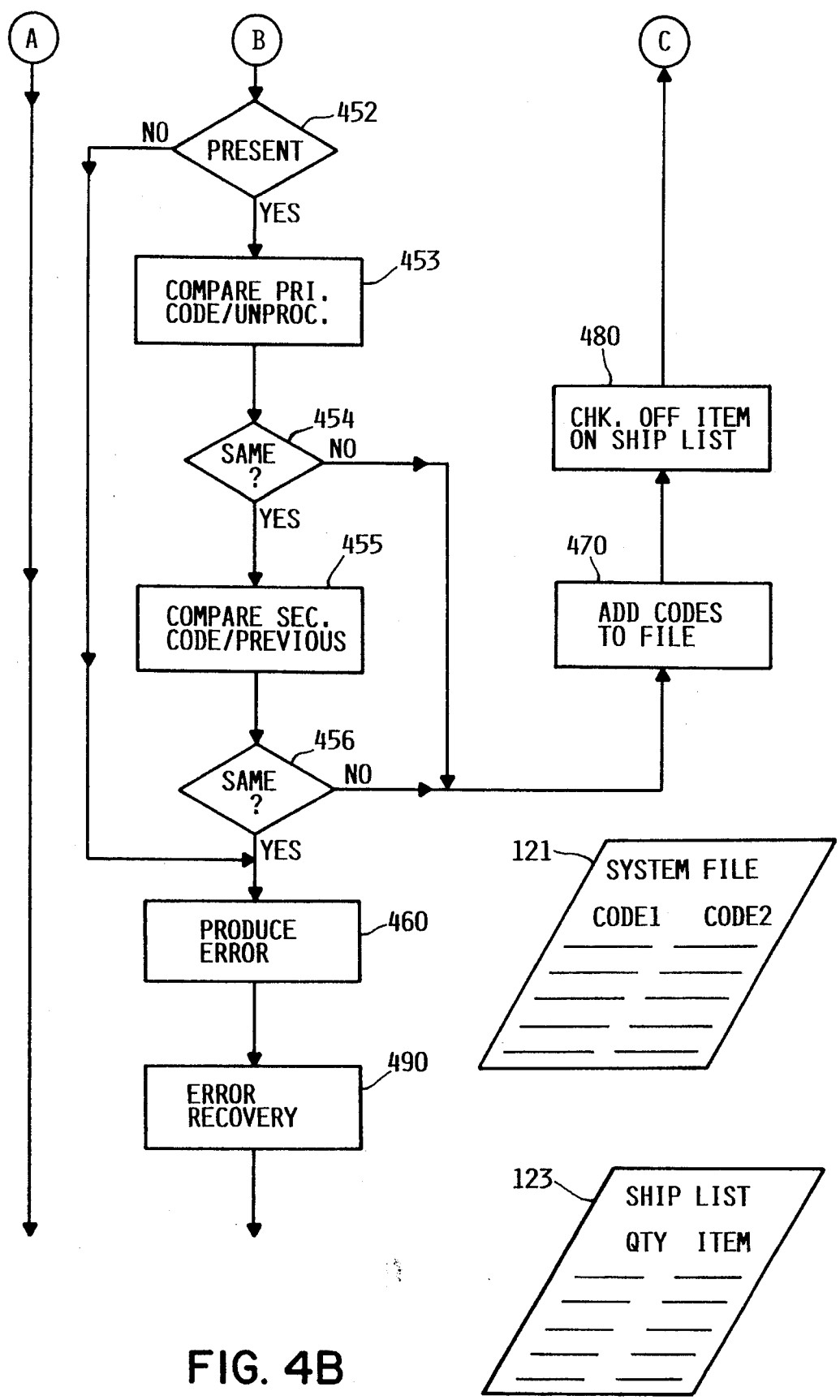

FIG. 4 is a flow chart of a method 400 for a customer to use the labelled components according to the invention in assembling a system or packaging a customized order group with reduced errors. Block 410 displays the list 121 containing the types of components for the current system, and the quantity of each component type to be included in the system. List 121 may be displayed on a computer or terminal at a station in the packaging area, as shown in FIG. 1. Alternatively, the list may be printed or otherwise made available to an assembly worker.

Block 420 indicates that the subsequent steps are performed once for each component in the system 110. The component type processed at each iteration may be the same as or different from that at any other iteration; that is, the order in which the components are assembled is immaterial to the method, so that the invention does not change or interfere with any other considerations as to how the system should be assembled for other reasons.

In block 430, the assembly worker obtains a component of the current type from the inventory located at his area, and scans its label code in block 440.

Blocks 450 then validate the choice of component, as described below. If the choice is invalid, block 460 produces an error signal. If the choice is valid, block 470 adds to file 123 an entry containing the primary and secondary code values for the current component, and block 480 checks off the appropriate entry in list 121. There are many ways to construct list 121 and file 123. List 121 may have a sequence of entries each having a field for specifying a component type code and another field containing a number representing the quantity of that component type in the particular system 110. Or each entry might merely specify a component type code, and contain duplicate entries for additional components of the same type. Each entry of file 123 may have a field containing the scanned value of a type code for each system component and another field containing the scanned value of the secondary code for that component. It may even be desirable in some cases to combine list 121 with file 123. Such a combined entity could have the same format as file 123. In this case, combined file 123 would arrive at step 410 having all primary-code fields already filled in, instead of being added in step 470, and all secondary-code fields blank. Multiple components of the same type are indicated by duplicate entries; step 410 could read these at multiple lines having the same component name, or could combine them and display each component name only once, but along with a number indicating the number of entries having the same type number. This combined list is preferred, from the standpoint of simplicity. Block 470 then enters a scanned secondary code in that entry having the (or one of the) prewritten primary code which matches the scanned secondary code of the current component. The status of a component as unprocessed or processed is thus indicated by whether the secondary-code field of its entry contains blanks or a valid value.

Block 451 compares the scanned primary-code value with that for the current component on list 121 (or for any remaining unprocessed component on the list, if order is unimportant). Block 452 produces an error signal at block 460 if it does not match the desired value; in that case, the component does not belong in the system at all—its type does not match any item on the ship list. If the item type does exist on the ship list, block 453 compares the scanned primary-code value with that of all entries of file 123, or with all unprocessed entries of list 121, if it is combined with file 123 as suggested above. If block 454 does not detect a match at this point, block 470 can add the primary and secondary codes of the current component to file 123 without checking the secondary code, because the combination must be unique at that point. But, if a match is found, block 455 must then compare the secondary-code value of the current component with that of all previous codes in file 123 (or with all processed entries in list 121, if combined) which have the same primary-code value. If these values are the same, then the same component specimen has been entered twice, or the operator has tried to circumvent the procedure, as by scanning a bare label that has been taped to a bench. In that case, block 456 causes block 460 to produce an error signal. Otherwise, block 470 adds the primary and secondary codes of the current component into an entry in file 123, or adds the secondary code to an unprocessed entry in list 121 having the primary-code value of the current component, scanned in block 440.

Method 400 ends when block 420 indicates no more components to be processed for the current system. It may also end abnormally when block 460 produces an error signal, although block 490 may provide conventional error-recovery methods, such as receiving a reset from the assembly worker or a manual override by the worker or by a supervisor. The latter may be desirable in that it may allow the size of the pool of allowable random numbers for the secondary code to be reduced drastically. For example, providing a confidence level of $p<10^{-6}$ in order to effectively avoid the necessity for any manual intervention may require a 12-digit secondary code. If manual intervention by a supervisor is permitted once per week on the average, then the confidence level can be lowered to, say, $p<10^{-3}$, which may require only a 3-digit secondary code.

When process 400 has been completed for a particular ship group 110, the ship group will have been verified to contain the correct number of the correct type of parts. Failure to scan each individual part, and scanning the same part multiple times, are eliminated as error sources. Randomly selected secondary codes obviate any need to store or to track individual secondary codes 220 for a ship group 110 in order to prevent errors in other ship groups, thus easing data-collection requirements. The codes used in one ship group can be deleted from all data bases before starting assembly of the next order or ship group. This, of course, decreases the repetition interval drastically; repetition of secondary codes must be avoided only during the assembly of a single ship group.

Having described a preferred embodiment thereof, we claim as our invention:

1. A method of packaging a plurality of systems each individually customizable from groups of component items of different types, comprising:

(a) performing steps (b) through (f) for each group of items of a particular type;

(b) specifying a particular primary code value which is the same for all items of said particular type, but different from those for different ones of said types;

(c) selecting a pool of secondary code values for said particular type;

(d) performing steps (e) through (f) for each individual item of said particular type;

(e) selecting a random one of said secondary code values from said pool;

(f) labelling said individual item with said particular primary code value and said random one of said secondary code values;

(g) performing steps (h) through (m) for each system of said plurality of systems;

(h) performing steps (i) through (m) for each item of a plurality of items in said each system;

(i) selecting said each item;

(j) scanning the primary and secondary code values on said each item;

(k) comparing said scanned primary and secondary code values with primary and secondary code values for all previously scanned items in the same system, if any;

(l) producing an error signal if the combination of said primary and secondary code values for said each item is the same as the combination of said primary and secondary code values for any of said previously scanned items in the same system;

(m) packaging said each item in said each system if the combination of said primary and secondary code values for said each item is not the same as the combination of said primary and secondary code values for any of said previously scanned items in said each system, wherein the size of said pool is such that any combination of said primary code value and said secondary code value for any item in said each system is unique within a predetermined confidence level.

2. A method of packaging a plurality of systems from groups of component items of different types, comprising:

(a) performing steps (b) through (f) for each group of items of a particular type;

(b) specifying a particular primary code value which is the same for all items of said particular type, but different from those for different ones of said types;

(c) selecting a pool of secondary code values for said particular type, the size of said pool being such that the combination of said particular primary code value and said secondary code value for any item in each of said systems is unique within a predetermined confidence level;

(d) performing steps (e) through (f) for each individual item of said particular type;

(e) selecting a random one of said secondary code values from said pool;

(f) labelling said individual item with said particular primary code value and said random one of said secondary code values so that erroneous selection of said individual item for packaging in one of said systems is detectable based on comparison of the combination of said primary and secondary code values for said individual item with the combination of said primary and secondary code values for any of said individual items previously selected for packaging in said one of said systems.

3. The method of claim 2, wherein said labelling step comprises placing at least one bar code on said individual item.

4. The method of claim 3, wherein said code values are numbers.

5. The method of claim 2, wherein the size of said pool is unique within said predetermined confidence level for a given lot size.

6. The method of claim 5, wherein items of at least one said particular type are shipped by multiple sources.

7. The method of claim 5, wherein the size of said pool is different for different ones of said different types.

8. A method of packaging a plurality of systems each individually customizable from variable numbers of component items of different types, wherein each of said items is labelled with a primary code value being the same for all said items of any one type, but different for items of different types, and with a secondary code having a random value selected from a pool of a size such that any combination of said primary code value and said secondary code value for any item in each of said systems is unique within a predetermined confidence level, said method comprising:

(a) performing steps (b) through (g) for each system of said plurality of systems;

(b) performing steps (c) through (g) for each item of a plurality of items in said each system;

(c) selecting said each item;

(d) scanning the primary and secondary code values on said each item;

(e) comparing said scanned primary and secondary code values with primary and secondary code values for all previously scanned items in the same system;

(f) producing an error signal if the combination of said primary and secondary code values for said each item is the same as the combination of said primary and secondary code values for any of said previously scanned items in the same system;

(g) packaging said each item in said each system if the combination of said primary and secondary code values for said each item is not the same as the combination of said primary and secondary code values for any of said previously scanned items in said each system, wherein the size of said pool is such that any combination of said primary code value and said secondary code value for any item in said each system is unique within a predetermined confidence level.

9. The method of claim 8, wherein said scanning step comprises scanning at least one bar code on said each item.

10. The method of claim 8, wherein the size of said pool is chosen to achieve said confidence level for a predetermined number of sources of said any one type.

11. The method of claim 8, step (b) includes the step of deleting said primary and secondary code values contained in said system file after step (g) has been performed for all said items in said each system.

12. A method of packaging a plurality of systems each individually customizable from variable numbers of component items of different types based on a ship list identifying the type of all said items to be packaged in said each system, wherein each of said items is labelled with a primary code value being the same for all said items of any one type, but different for items of different types, and with a secondary code having a random value selected from a pool of a size such that any combination of said primary code value and said secondary code value for any item in each of said systems is unique within a predetermined confidence level, said method comprising:

(a) performing steps (b) through (g) for each system of said plurality of systems;

(b) performing steps (c) through (g) for each item of a plurality of items in said each system;

(c) selecting said each item based on said ship list;

(d) scanning the primary and secondary code values on said each item;

(e) comparing said scanned primary and secondary code values with primary and secondary code values in a system file containing primary and secondary code values for all previously scanned items in the same system;

(f) producing an error signal if the combination of said primary and secondary code values for said each item is the same as the combination of said primary and secondary code values for any of said previously scanned items in the same system;

(g) packaging said each item in said each system if the combination of said primary and secondary code values for said each item is not the same as the combination of said primary and secondary code values for any of said previously scanned items in said each system, said packaging step includes the steps of adding said primary and secondary code values for said each item to said system file and modifying said ship list to indicate that said each item is now packaged in said each system, wherein the size of said pool is such that any combination of said primary code value and said secondary code value for any item in said each system is unique within a predetermined confidence level.

* * * * *